(No Model.)

M. L. MILLER.
SLIDING GRATE ATTACHMENT FOR STOVE OVENS.

No. 347,007. Patented Aug. 10, 1886.

Witnesses
E. B. Dufur
Wm. Y. Masters

Martin L. Miller
By E. E. Masson
Atty

UNITED STATES PATENT OFFICE.

MARTIN L. MILLER, OF OREGON CITY, OREGON.

SLIDING-GRATE ATTACHMENT FOR STOVE-OVENS.

SPECIFICATION forming part of Letters Patent No. 347,007, dated August 10, 1886.

Application filed January 25, 1884. Serial No. 118,748. (No model.)

*To all whom it may concern:*

Be it known that I, MARTIN L. MILLER, a citizen of the United States, and a resident of the town of Oregon City, in the county of Clackamas and State of Oregon, have invented certain new and useful Improvements in Sliding-Grate Attachments for Stove-Ovens, of which the following is a specification.

My invention relates to an attachment for stove-ovens, which is for the purpose of sliding the grate therein and facilitate placing any article to be cooked thereon in a suitable pan, and also facilitate the removal of said article, said grate being operated by a crank located upon the oven-door, and having one end pivoted to a connecting-rod attached underneath the grate, all of which movement can be performed by operating the knob and crank. To open the oven-door, the knob and crank are slightly lifted and the door swung open, and then when it is desired to draw forth the grate the crank is revolved, and the same operation in the reverse returns the grate back inside the oven, and a forward movement of the knob and crank shuts the oven-door, all of which obviates the necessity of stooping down and opening the oven-door in the usual manner.

Figure 2:
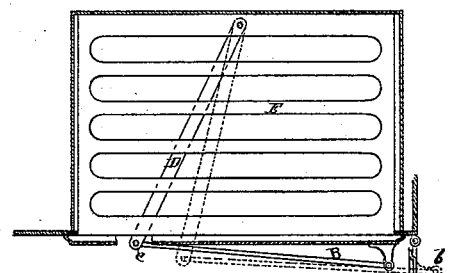
Figure 1:
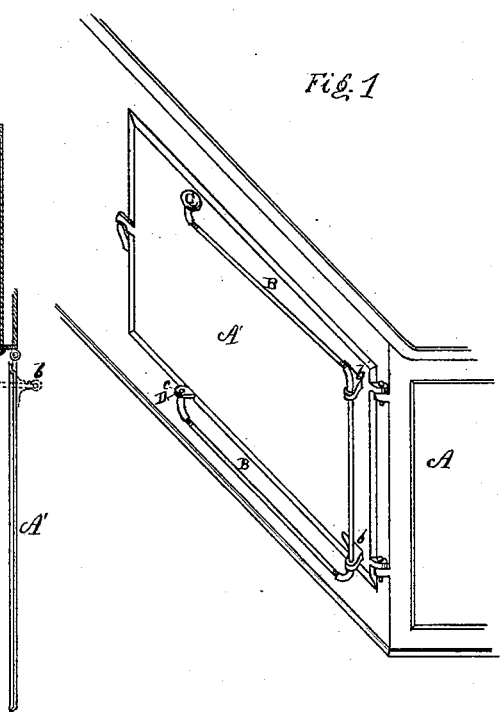
Figure 3:
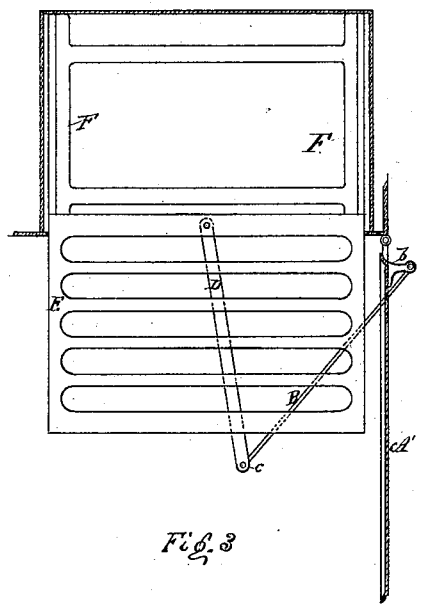
Figure 4:
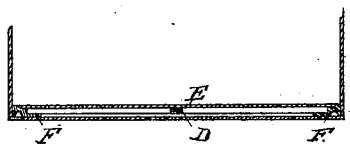

In the accompanying drawings, forming part of this specification, Figure 1 is a view in perspective, showing the crank retained in two hinges on outside of door and one end fitting in the pivoted rod attached to grate. Fig. 2 is a view in horizontal section looking down into the oven, showing the grate, the lever, and crank, the dotted lines indicating the movement of the connecting-rod and crank in opening the oven-door. Fig. 3 is a similar view showing the movement of the crank and rod when revolved and the grate drawn forth; and Fig. 4 is an end section showing the slide upon which the grate rests in oven and the pivoted connecting-rod.

A′, in Figs. 1, 2, 3, represents the oven-door.

B is the crank, of the shape shown. It is retained in hinges $b\ b$ on outside of oven-door, the upper end having a knob or handle, C, and the lower end fitting into an aperture, $c$, in the connecting-rod D, which rod D is pivoted on under side of grate E, as shown in Figs. 2, 3, 4 of drawings.

The oven-door A′ of stove A has the usual hinges.

The operation of my invention is as follows: The handle and crank are slightly lifted and the door opened, which causes one end of the rod D to swing toward the crank, as shown by dotted lines in Fig. 2, and the door opens, as shown in same Fig. 2. This movement does not disturb the grate in oven, but when the crank is revolved then the grate is drawn forth, as shown in Fig. 3 of drawings. The grate rests when inside of oven upon a slide, F, which fits inside the oven of stove. When the crank is revolved toward the oven, the grate is pushed back into oven, and the door will close and crank resume the position shown in Fig. 1 of drawings. The knob does not project above, but is underneath the extending flange of top of stove.

Having described my invention, what I claim as new, and desire to secure by Letters Patent, is—

1. The combination of the oven-door, the lever pivoted thereon, its connecting-rod, and the sliding-grate located within the oven, substantially as described.

2. The combination of an oven-door having hinge-brackets $b$, the crank-lever pivoted thereon, the sliding-grate within the oven, and the connecting-rod uniting said grate and lever, substantially as and for the purpose described.

MARTIN L. MILLER.

Witnesses:
RUSS TEACHOUT,
J. U. POWELL.